(12) United States Patent
Roberts (10) Patent No.: US 8,875,486 B2
(45) Date of Patent: Nov. 4, 2014

(54) GUIDE SYSTEM FOR NACELLE ASSEMBLY

(75) Inventor: Stephen Michael Roberts, Boulder, CO (US)

(73) Assignee: Rohr, Inc., Chula Vista, CA (US)

( * ) Notice: Subject to any disclaimer, the term of this patent is extended or adjusted under 35 U.S.C. 154(b) by 1051 days.

(21) Appl. No.: 12/781,242

(22) Filed: May 17, 2010

(65) Prior Publication Data

US 2011/0277448 A1    Nov. 17, 2011

(51) Int. Cl.

| | |
|---|---|
| *B63H 11/14* | (2006.01) |
| *F02K 1/06* | (2006.01) |
| *F02K 1/54* | (2006.01) |
| *F02K 1/56* | (2006.01) |
| *F02K 1/08* | (2006.01) |
| *F02K 1/76* | (2006.01) |
| *B64D 33/04* | (2006.01) |
| *F02K 1/09* | (2006.01) |
| *F02K 1/62* | (2006.01) |
| *B64D 29/06* | (2006.01) |
| *F02K 1/72* | (2006.01) |

(52) U.S. Cl.
CPC . *B64D 33/04* (2013.01); *F02K 1/08* (2013.01); *F02K 1/763* (2013.01); *Y02T 50/672* (2013.01); *F02K 1/09* (2013.01); *F02K 1/625* (2013.01); *B64D 29/06* (2013.01); *F02K 1/72* (2013.01)
USPC ............. 60/226.2; 60/770; 60/39.5; 60/796; 60/230; 239/265.11; 239/265.29; 244/53 R; 244/110 B (58) Field of Classification Search
USPC ............. 60/770, 771, 39.5, 796, 798, 226.2, 60/230; 239/265.11, 265.13, 265, 19, 239/265.27, 265.31, 265.23, 265.29; 244/53 R, 54, 110 B
See application file for complete search history.

(56) References Cited

U.S. PATENT DOCUMENTS

| | | | |
|---|---|---|---|
| 3,360,308 A | 12/1967 | Grabowski et al. | |
| 3,404,581 A | 10/1968 | Kraus | |

(Continued)

FOREIGN PATENT DOCUMENTS

| | | |
|---|---|---|
| EP | 0109219 A2 | 5/1984 |
| EP | 0315524 A1 | 5/1989 |

(Continued)

OTHER PUBLICATIONS

English translation of Official Action for Chinese Application No. 200880102315.X, dated Sep. 25, 2012, 32 pgs.

(Continued)

*Primary Examiner* — Ehud Gartenberg
*Assistant Examiner* — Karthik Subramanian
(74) *Attorney, Agent, or Firm* — Snell & Wilmer L.L.P.

(57) ABSTRACT

A guide system for translating components of an aircraft engine nacelle includes a track assembly and a slider assembly. The track assembly includes a track guide member and a track liner engaged therewith. The track guide member includes a track channel configured to receive the track liner. The track liner defines an interior surface and includes a projection portion projecting inwardly of the track channel to define a convex surface. The slider assembly translatably engages the track assembly and includes a slider member having a head portion configured to be received within the track channel. The head portion defines a concave surface substantially corresponding to the convex surface of the track liner and is configured to mate therewith. The slider member further includes an extension portion extending from the head portion and outwardly of the track assembly.

20 Claims, 10 Drawing Sheets

(56) References Cited

U.S. PATENT DOCUMENTS

| | | | |
|---|---|---|---|
| 3,747,341 A | 7/1973 | Davis | |
| 3,779,010 A | 12/1973 | Chamay et al. | |
| 3,820,719 A | 6/1974 | Clark | |
| 4,375,276 A | 3/1983 | Konarski | |
| 4,407,120 A * | 10/1983 | Timms | 60/226.2 |
| 4,442,987 A | 4/1984 | Legrand et al. | |
| 4,519,561 A | 5/1985 | Timms | |
| 4,922,713 A | 5/1990 | Barbarin et al. | |
| 5,174,502 A * | 12/1992 | Lippmeier et al. | 239/265.41 |
| 5,209,057 A * | 5/1993 | Remlaoui | 60/226.2 |
| 5,228,641 A | 7/1993 | Remlaoui | |
| 5,285,637 A * | 2/1994 | Barcza | 239/265.35 |
| 5,297,387 A | 3/1994 | Carimali et al. | |
| 5,328,098 A * | 7/1994 | Barcza et al. | 239/265.35 |
| 5,575,147 A | 11/1996 | Nikkanen | |
| 5,655,360 A | 8/1997 | Butler | |
| 5,778,659 A * | 7/1998 | Duesler et al. | 60/226.1 |
| 5,806,302 A | 9/1998 | Cariola et al. | |
| 5,960,626 A | 10/1999 | Baudu et al. | |
| 5,996,937 A | 12/1999 | Gonidec et al. | |
| 6,079,201 A | 6/2000 | Jean | |
| 6,167,694 B1 | 1/2001 | Davies | |
| 6,170,254 B1 | 1/2001 | Cariola | |
| 6,199,772 B1 * | 3/2001 | Renggli | 239/265.33 |
| 6,474,059 B2 | 11/2002 | Stretton | |
| 6,625,972 B1 * | 9/2003 | Sternberger | 60/226.2 |
| 6,681,559 B2 | 1/2004 | Johnson | |
| 6,824,101 B2 * | 11/2004 | Sternberger et al. | 244/110 B |
| 6,845,945 B1 | 1/2005 | Smith | |
| 6,968,675 B2 | 11/2005 | Ramlaoui et al. | |
| 6,976,352 B2 | 12/2005 | Lair | |
| 7,096,661 B2 * | 8/2006 | Bush et al. | 60/232 |
| 7,174,828 B2 | 2/2007 | Davies et al. | |
| 8,006,479 B2 | 8/2011 | Stern | |
| 8,104,261 B2 | 1/2012 | Marshall et al. | |
| 2004/0079073 A1 | 4/2004 | Ramlaoui et al. | |
| 2007/0294996 A1 | 12/2007 | Stephan et al. | |
| 2008/0084130 A1 | 4/2008 | Darby et al. | |
| 2009/0013664 A1 | 1/2009 | Jones et al. | |
| 2009/0053058 A1 | 2/2009 | Kohlenberg et al. | |
| 2009/0288386 A1 | 11/2009 | Marshall et al. | |
| 2010/0031630 A1 | 2/2010 | Bulin et al. | |
| 2010/0139242 A1 | 6/2010 | Vauchel et al. | |
| 2010/0192715 A1 | 8/2010 | Vauchel et al. | |
| 2010/0205931 A1 | 8/2010 | Baudu et al. | |
| 2010/0229527 A1 | 9/2010 | Amkraut et al. | |
| 2010/0229528 A1 | 9/2010 | Ramlaoui et al. | |

FOREIGN PATENT DOCUMENTS

| | | |
|---|---|---|
| EP | 0779429 A2 | 6/1997 |
| EP | 1052427 A2 | 11/2000 |
| EP | 1878904 A2 | 1/2008 |
| EP | 2050948 A2 | 4/2009 |
| EP | 1978231 B1 | 2/2012 |
| FR | 2866020 A1 | 12/2005 |
| FR | 2917788 A1 | 6/2007 |
| FR | 2921976 A1 | 10/2007 |
| FR | 2922059 A1 | 10/2007 |
| FR | 2912189 A1 | 8/2008 |
| GB | 841110 | 7/1960 |
| GB | 925010 A | 5/1963 |
| GB | 2285020 A | 6/1995 |
| WO | 02/103189 A1 | 12/2002 |
| WO | 2005082771 A1 | 9/2005 |
| WO | 2008045056 A1 | 4/2008 |
| WO | 2009029401 A2 | 3/2009 |

OTHER PUBLICATIONS

Official Action for Chinese Application No. 201010206330.8, dated Oct. 8, 2012, 6 pgs.
English translation of Official Action for Chinese Application No. 201010206330.8, dated Oct. 8, 2012, 8 pgs.
Official Action for Chinese Application No. 201010156573.5, dated Oct. 10, 2012, 6 pgs.
English translation of Official Action for Chinese Application No. 201010156573.5, dated Oct. 10, 2012, 8 pgs.
Official Action for U.S. Appl. No. 12/419,080, dated Dec. 7, 2012, 8 pgs.
Slider Track Design Nos. 1-5, known as of May 16, 2010, pp. 1-2.
Official Action for Chinese Application No. 201010206302.6, dated Nov. 5, 2012, 12 pgs.
English translation of Official Action for Chinese Application No. 201010206302.6, dated Nov. 5, 2012, 16 pgs.
Official Action (U.S. Appl. No. 12/057,497), dated Sep. 28, 2011, 9 pgs.
Official Action (EP App. No. 08251152.8), dated Jul. 7, 2010, 6 pgs.
EP Search Report (EP App. No. 10002809.1), dated Nov. 21, 2011, 5 pgs.
European Search Report (EP 10005250), dated Jan. 25, 2012, 5 pgs.
European Search Report dated Jan. 23, 2012 (EP Application No. 10005249), 5 pgs.
Official Action for U.S. Appl. No. 12/057,497, dated Feb. 2, 2012, 17 pgs.
Official Action for U.S. Appl. No. 12/485,559, dated Jun. 12, 2012, 15 pgs.
Official Action for U.S. Appl. No. 12/485,551, dated Jun. 27, 2012, 18 pgs.
Official Action of U.S. Appl. No. 12/419,080, dated Aug. 1, 2012, 8 pgs.
Official Action for U.S. Appl. No. 12/419,080, dated Mar. 23, 2012, 12 pgs.
Exam Report dated Sep. 18, 2013 in European Application No. 12002710.7.
Extended Search Report dated Mar. 12, 2013 in European Application No. 12197068.5.
Office Action dated Dec. 5, 2013 in Chinese Application No. 201110126044.5.
Office Action dated Nov. 26, 2013 in Chinese Application No. 201010156573.5.
Office Action dated Jun. 5, 2013 in Chinese Application No. 201010156573.5.
Notice of Allowance dated Mar. 15, 2013 in U.S. Appl. No. 12/419,080.

* cited by examiner

GUIDE SYSTEM FOR NACELLE ASSEMBLY

TECHNICAL FIELD

The present invention generally relates to gas turbine aircraft engines, and particularly relates to a guide system for a translating thrust reverser and a translating variable area nozzle assembly for a turbofan aircraft engine for use in selectively controlling the fan bypass flow exhausted from the engine in order to adjust the engine's performance under varying flight conditions.

BACKGROUND

Typical aircraft turbofan jet engines include a fan that draws and directs a flow of air into a nacelle and into and around an engine core. The nacelle surrounds the engine core and helps promote the laminar flow of air around the core. The flow of air that is directed into the engine core is initially passed through a compressor that increases the air flow pressure, and then through a combustor where the air is mixed with fuel and ignited. The combustion of the fuel and air mixture causes a series of turbine blades at the rear of the engine core to rotate, and to drive the engine's rotor and fan. The high-pressure exhaust gases from the combustion of the fuel and air mixture are thereafter directed through an exhaust nozzle at the rear of the engine.

Bypass flow is air that is directed around the engine core. In turbofan engines, the bypass flow typically provides the main thrust for an aircraft. The bypass flow also can be used to help slow a landed aircraft. Translatable thrust reversers mounted in the nacelle structure selectively reverse the direction of the bypass flow to generate reverse thrust. The thrust reverser is translatable via a guide system directed by an actuation device.

Several turbofan engine parameters are important to optimize design characteristics and performance. One design consideration for optimizing such parameters includes varying the fan nozzle exit area of a high-bypass ration (BPR) engine during operation by translating the engine's variable fan nozzle to optimize engine performance under various flight conditions. By selectively varying the fan nozzle's exit area, an engine's bypass flow characteristics can be adjusted to match a particular flight condition. One way of varying the fan nozzle exit area involves using a translating sleeve to increase or decrease the exit area. Providing a translating sleeve requires a guide system that properly considers surrounding reacting loads (inboard, outboard, and radial) and efficiently manages contact stresses. Also, translating guide systems require a design to minimize seizing of translating components during use.

Accordingly, a need exists for a guide system for a thrust reverser and/or a variable area nozzle assembly for turbofan aircraft engine that is capable of reacting to inboard loads, as well as outboard and radial loads, and effectively managing contact stresses, while minimizing the potential to seize during use.

SUMMARY

The invention includes a guide system for translating components of an aircraft engine nacelle. The guide system includes a track assembly adapted to operably engage a first portion of a nacelle. The track assembly includes a track guide member and a track liner operably engaged therewith. The track guide member has a track channel configured to receive the track liner. The track liner defines an interior surface and has a projection portion projecting inwardly of the track channel to define a convex surface. The guide system further includes a slider assembly configured to translatably engage the track assembly. The slider assembly includes a slider member having a head portion configured to be received within the track channel. The head portion defines a concave surface substantially corresponding to the convex surface of the track liner and is configured to mate therewith. The slider member further includes an extension portion extending from the head portion and outwardly of the track assembly.

The invention also includes a nacelle assembly for a turbofan aircraft engine having a first and second nacelle portion. The nacelle assembly further includes a track assembly operably engaged with the first nacelle portion. The track assembly includes a track guide member and a track liner operably engaged therewith. The track guide member has a track channel configured to receive the track liner. The track liner defines an interior surface and has a projection portion projecting inwardly of the track channel to define a convex surface. The nacelle assembly further includes a slider assembly configured to translatably engage the track assembly. The slider assembly includes a slider member having a head portion configured to be received within the track channel The head portion defines a concave surface substantially corresponding to the convex surface of the track liner and is configured to mate therewith. The slider member further has an extension portion extending from the head portion and outwardly of the track assembly. The second nacelle portion is operably engaged with the extension portion of the slider member.

In another embodiment, a nacelle assembly includes a stationary first nacelle portion. A stationary track assembly is operably engaged with the stationary first nacelle portion. The track assembly includes a track guide member and a track liner operably engaged therewith. The track guide member has a track channel configured to receive the track liner. The track liner defines an interior surface and has a projection portion projecting inwardly of the track channel to define a convex surface. The nacelle assembly further includes means for slidably engaging one of a translatable variable area fan nozzle section and a translatable thrust reverser sleeve to the stationary track assembly. The means for slidably engaging the one of a translatable variable area fan nozzle section and a translatable thrust reverser sleeve includes a concave portion substantially corresponding to the convex portion of the track assembly. The concave portion is configured to correspondingly mate with the convex portion. The nacelle assembly further includes means for actuating the means for slidably engaging the one of a translatable variable area fan nozzle section and a translatable thrust reverser sleeve.

These and other features, aspects, and advantages of the invention will be apparent from a reading of the following detailed description together with the accompanying drawings, which are briefly described below.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

DETAILED DESCRIPTION

FIGS. 1-6 show one embodiment of a translating variable area fan nozzle assembly (VAFN) for a turbofan engine 10.

Figure 1:
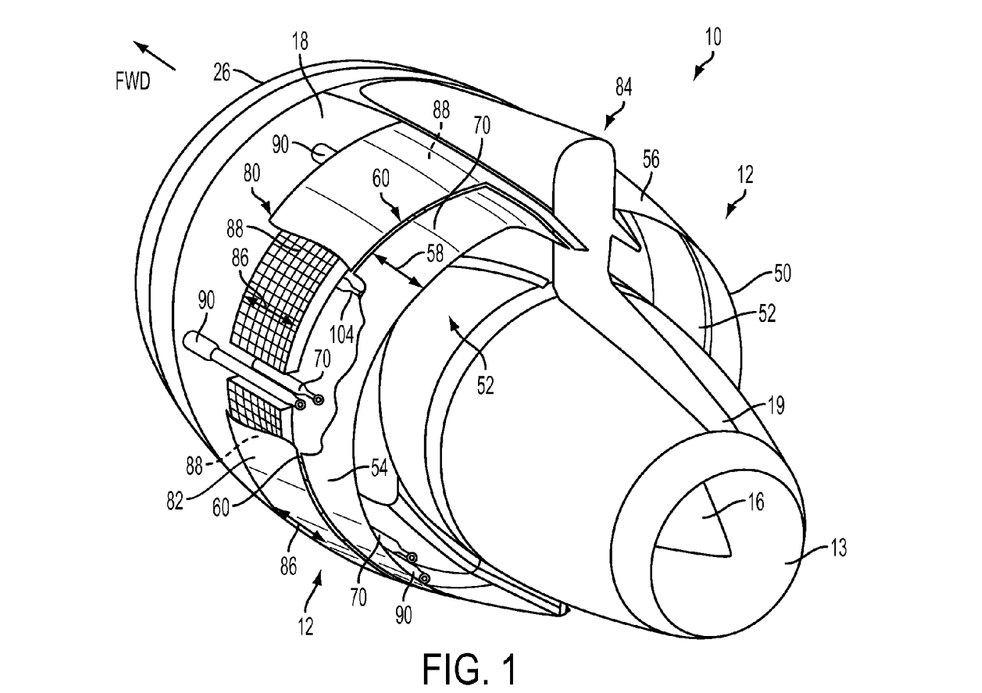
FIG. 1 is a perspective view of an aircraft engine having a cascade-type thrust reverser and a translating variable area fan nozzle assembly.
Figure 2:
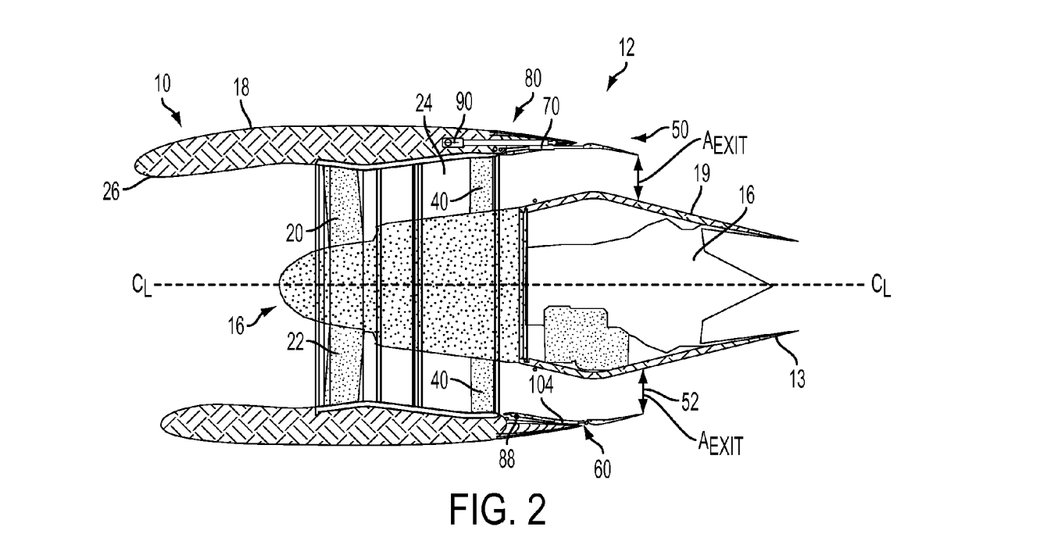
FIG. 2 is a longitudinal cross section of the aircraft engine shown in FIG. 1.

Referring to FIGS. 1 and 2, the engine 10 includes a fan nozzle assembly 12 having a translating nozzle 50 that can be selectively adjusted, for example, as the engine 10 operates under different flight conditions. As discussed above, such an adjustment can be used to optimize an engine's performance. As shown in FIG. 2, the translating nozzle 50 can be selectively translated (i.e., moved fore and aft) to vary the fan nozzle's exit area "$A_{exit}$" in order to optimize engine performance, and as described in detail below, to adjust an amount of engine bypass flow spilled through an upstream exit 60 formed by the variable area fan nozzle assembly 12. By bleeding or spilling off excess fan flow through the upstream exit 60 before the excess air flow reaches the primary fan nozzle exit 52, lower fan pressure ratios for the same amount of delivered mass flow can be obtained, thereby increasing stall margins and avoiding engine non-optimal performance. For purposes of illustration, the variable area fan nozzle assembly 12 is shown in the context of a turbofan jet aircraft engine 10. The engine 10 can be mounted to a wing or fuselage of an aircraft, for example, by a pylon or other similar support (not shown in the figures).

As shown in FIG. 2, the engine 10 includes an engine core 16 and a stationary nacelle 18 surrounding the core 16. The engine core 16 is housed within a core cowl 19. The engine's fan 20 is positioned within an upstream portion of the nacelle 18, and includes a plurality of fan blades 22 that are mounted on the engine's rotor (not shown). The fan blades 22 rotate about the engine's centerline $C_L$ and draw a flow of air into an inlet end 26 of the engine 10. An annular bypass duct 24 is defined between the engine core 16 and the nacelle 18. The air flow drawn into the engine 10 is accelerated by the rotating fan blades 22, and a portion of the incoming air flow is directed into and through the engine core 16.

Bypass flow enters the upstream end of the nacelle 18 and flows around and past the engine core 16. The bypass flow is accelerated by the rotating fan blades 22 and passes through the bypass duct 24 and past stators 40, and exits the engine 10 through the variable area fan nozzle assembly 12. The high-pressure heated exhaust gases from the combustion of the fuel and air mixture exit the engine core 16 through a primary exhaust nozzle 13 at the aft end of the engine 10.

In the engine assembly 10 shown in FIGS. 1-6, the translating nozzle 50 can be a nozzle-like annular airfoil structure mounted at the trailing end of a cascade-type thrust reverser 80 that circumscribes the engine core cowl 19 at the aft end of the nacelle 18.

As shown in FIG. 2, a downstream nozzle exit 52 between the trailing edge of the fan nozzle 50 and the core cowl 19 defines a fan nozzle exit area "$A_{exit}$". Due to the longitudinal variations in the diameter of the core cowl 19, selective fore and aft movement of the translating nozzle 50 changes the size of the fan nozzle exit area $A_{exit}$. As shown in FIG. 1, the fan nozzle 50 can include a first arcuate nozzle section 54 and a second arcuate nozzle section 56, each nozzle section 54, 56 being axially translatable in the direction of the bidirectional arrow 58. Translation of the translating nozzle 50 effects a desired size of the upstream exit 60, and also varies the outlet geometry and effective exit area $A_{exit}$ of the downstream nozzle exit 52. Hence, when the translating nozzle 50 is deployed (or moved) in the aft direction, bypass air is discharged from the engine assembly 10 through both the upstream exit 60 and the enlarged downstream nozzle exit 52. As shown in FIGS. 1-3, the translating nozzle 50 can be selectively translated fore and aft by a plurality of linear nozzle actuators 70, for example.

The cascade-type thrust reverser 80 can be positioned forward of the translating nozzle 50 in order to selectively block and redirect bypass flow from the bypass duct 24 in a manner known in the art. In FIG. 1, the thrust reverser 80 and the translating nozzle 50 are both in their stowed positions. As shown in FIG. 1, the thrust reverser 80 can include a first arcuate sleeve section 82 and an opposed second arcuate sleeve section 84 (shown in FIG. 3). As indicated by bi-directional arrow 86 in FIG. 1, the thrust reverser sleeve sections 82, 84 can be translated in the fore and aft directions by a plurality of spaced sleeve actuators 90. In a stowed position, the thrust reverser sleeve sections 82, 84 cover an array of cascade vanes 88. The cascade vanes 88 are indicated under the cut-away section of the sleeve section 82. Axial translation of the thrust reverser sleeve sections 82, 84 in the aft direction to a deployed position and deployment of a series of blocker doors (not shown) within the bypass duct 24 causes bypass air flow to exit the bypass duct 24 through the cascade vanes 88 which turn the exiting flow in a generally forward direction to create reverse thrust.

Figure 3:
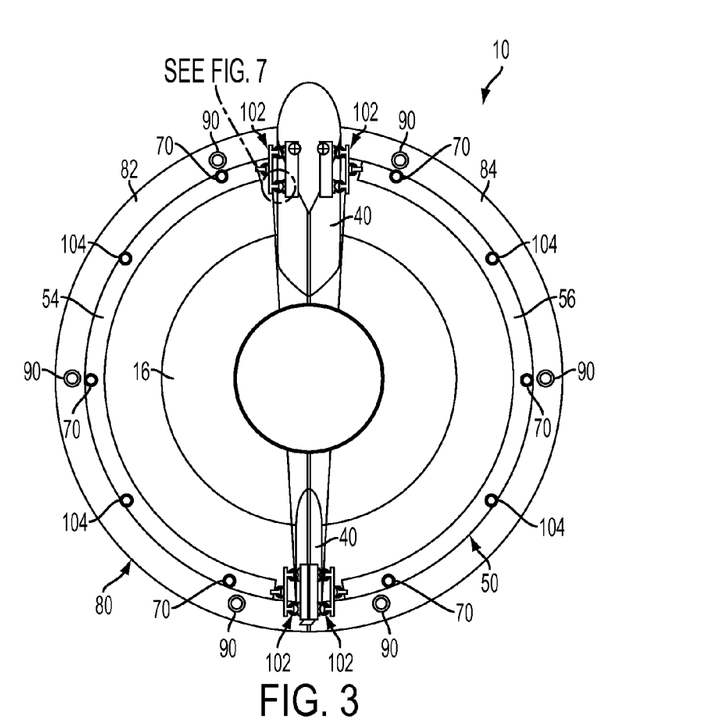
FIG. 3 is a rear elevation view of the aircraft engine shown in FIGS. 1-2.

FIG. 3 is a partial section view of the aft end of the engine 10, and illustrates one arrangement of the nozzle and sleeve actuators 70, 90, respectively, around the periphery of the engine 10. As shown in FIG. 1, and more clearly in FIG. 3, the sleeve half section 82 and the nozzle half-section 54 cooperate to generally define an approximately 180-degree sector of the combined thrust reverser and translating nozzle structure. Likewise, sleeve half section 84 and nozzle half section 56 cooperate to generally define an opposed approximately 180-degree sector of the thrust reverser and translating nozzle structure. Together, these approximate 180-degree sectors cooperate to define the complete thrust reverser/translating nozzle structure.

As shown in FIGS. 1-3, the thrust reverser sleeve sections 82, 84 can each be selectively translated in the fore and aft directions by one or more circumferentially spaced sleeve actuators 90 that are connected to the nacelle 18. In the embodiment shown, three actuators 90 are used for each sleeve half-section 82, 84. As discussed above, each section 54, 56 of the translating nozzle 50 can be selectively translated by one or more circumferentially spaced nozzle actuators 70. In the embodiment shown, each nozzle actuator 70 is disposed between a thrust reverser sleeve section 82, 84 and a respective fan nozzle section 54, 56. The sleeve actuators 90 and the nozzle actuators 70 can be electrical, mechanical, pneumatic, hydraulic, or the like, and can be interconnected by appropriate power cables and conduits (not shown). The number and arrangement of nozzle and sleeve actuators 70, 90 can vary according to the thrust reverser and nozzle assembly configurations or other factors.

Figure 7:
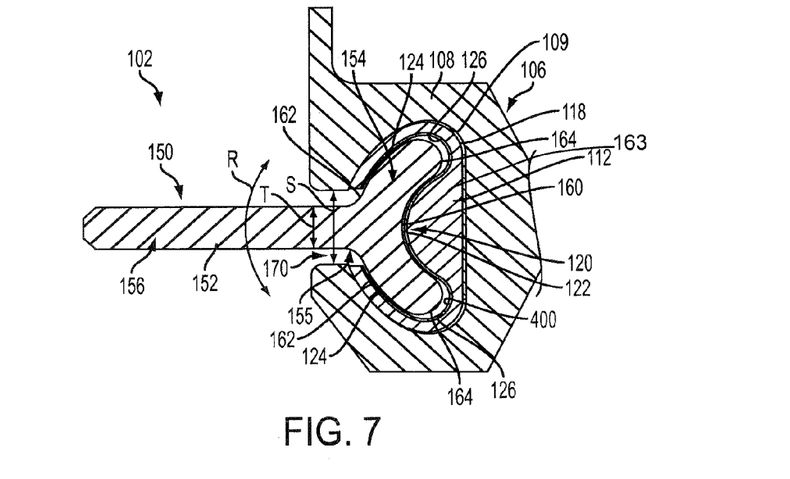
FIG. 7 is a cross sectional view of a guide structure for movably supporting a thrust reverser sleeve or a variable area fan nozzle section, according to one embodiment of the present invention.

As shown in FIG. 3, the nozzle sections 54, 56 can be movably mounted on the engine 10 by upper and lower guide systems 102. FIG. 7, as will be discussed below, shows a detailed view of one embodiment of a guide system 102.

As shown in FIGS. 1-3, guide tubes 104 can be mounted to the nacelle 18, and can extend into the nozzle sections 54, 56 to stabilize the nozzle sections 54, 56 against undesirable translation and/or vibration. The guide tubes 104 can each include an elongated slider that translates within the tube (not shown in the figures), for example.

As shown in FIG. 3, the translating nozzle 50 can include arcuate nozzle sections 54, 56 having airfoil profiles. The upstream exit 60 shown in FIG. 2 is formed when the translating nozzle 50 is deployed in the aft direction (i.e., away from the fixed thrust reverser sleeve sections 82, 84), and can have the form of a generally circular annular gap. Alternatively, the upstream exit 60 can have a non-circular shape. The gap 60 between the nozzle sections 54, 56 and the sleeve sections 82, 84 can be continuous, or can be interrupted at one or more locations, such as, for example, at points of separation between nozzle segments 54, 56 of the translating nozzle 50.

The translating nozzle 50 and surrounding structure are described below with reference to FIGS. 4-7. In FIGS. 4-7, elements that are obscured or partially obscured due to intervening elements are indicated by dashed lead lines.

Figure 4:
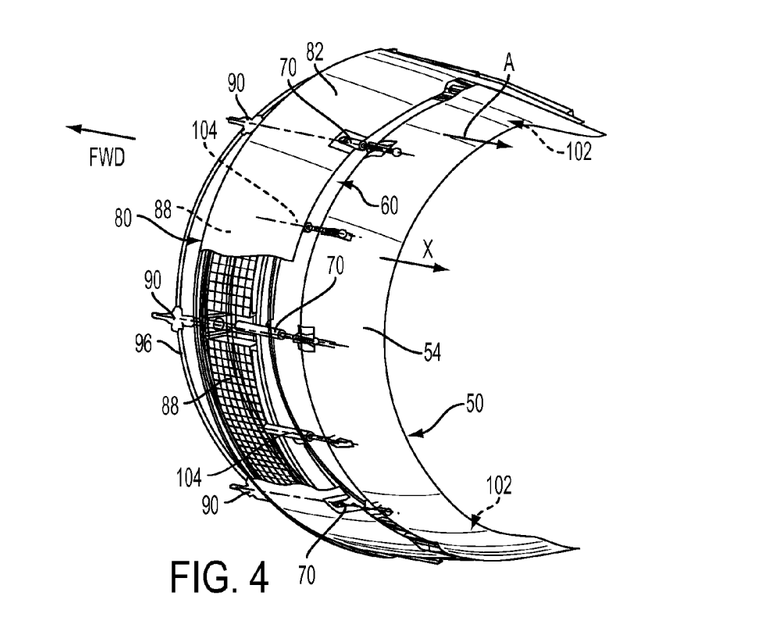
FIG. 4 is a perspective view of the thrust reverser and translating variable area fan nozzle assembly portions of the aircraft engine shown in FIGS. 1-3 with a thrust reverser sleeve in a stowed position, and a variable area fan nozzle in a deployed position.
Figure 5:
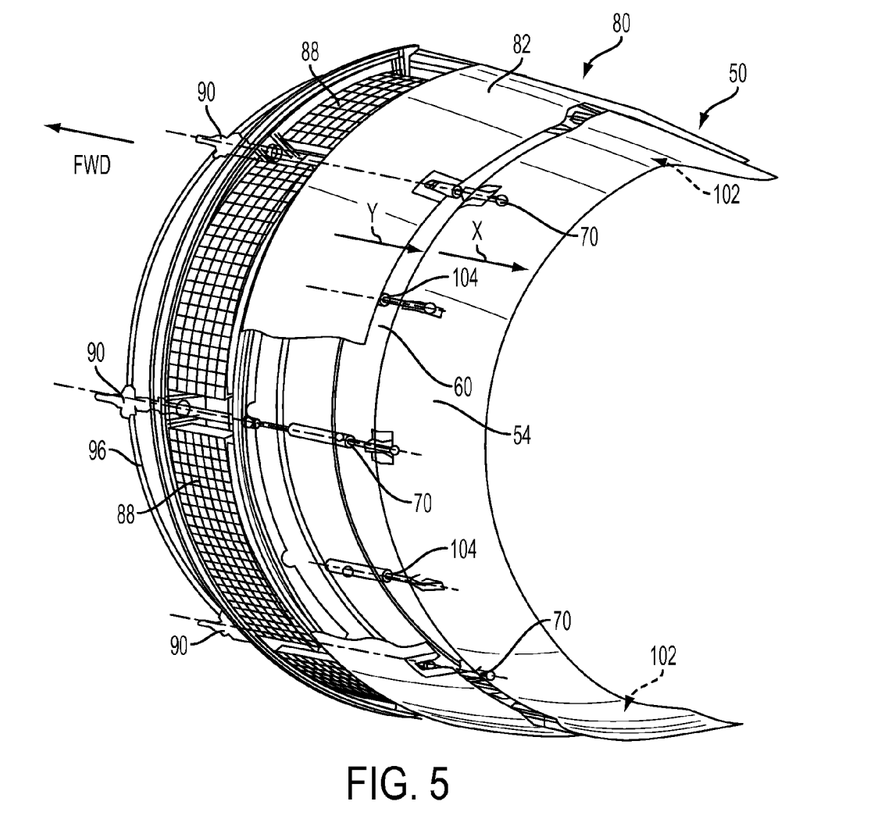
FIG. 5 is a perspective view of the thrust reverser and translating variable area fan nozzle assembly shown in FIG. 4 with both the thrust reverser sleeve and the variable area fan nozzle in deployed positions.

FIG. 4 is a partial view of one embodiment of a mounting structure for a first nozzle section 54 of the translating nozzle 50 and the corresponding, adjacent first sleeve section 82 of the thrust reverser 80. The second nozzle section 56 of the translating nozzle 50 and the second sleeve section 84 of the thrust reverser 80 (not shown in FIG. 4) can be mounted in a similar manner. In FIG. 4, the thrust reverser 80 is shown in a stowed position, and the first sleeve section 82 covers an associated portion of the cascade vanes 88. Also in FIG. 4, the translating nozzle 50 is in an open or deployed position, which results in formation of the upstream exit 60 between the first nozzle section 54 and the first sleeve section 82. Rearward axial translation of the first nozzle section 54 from its stowed position to its deployed position is indicated in FIGS. 4-5 by directional arrow "X". As shown in FIG. 4, the nozzle actuators 70 can extend from the sleeve section 82 and across the upstream exit 60, and can connect to a forward portion of the nozzle section 54. The guide tubes 104 can also extend from the sleeve section 82 and across the upstream exit 60, and can connect to a forward portion of the nozzle section 54. A flexible shaft 96 can interconnect two or more of the sleeve actuators 90 to power the actuators 90, and/or to synchronize actuation of two or more actuators 90.

FIG. 5 shows the first thrust reverser sleeve section 82 and the first translating nozzle section 54 in their deployed positions, for illustrative purposes. Rearward axial translation of the first sleeve section 82 from its stowed position (as shown in FIG. 4) to its deployed position (as shown in FIG. 5) is indicated in FIG. 5 by directional arrow "Y". Rearward translation of the sleeve section 82 exposes the cascade vanes 88 during operation of the thrust reverser 80.

Figure 6:
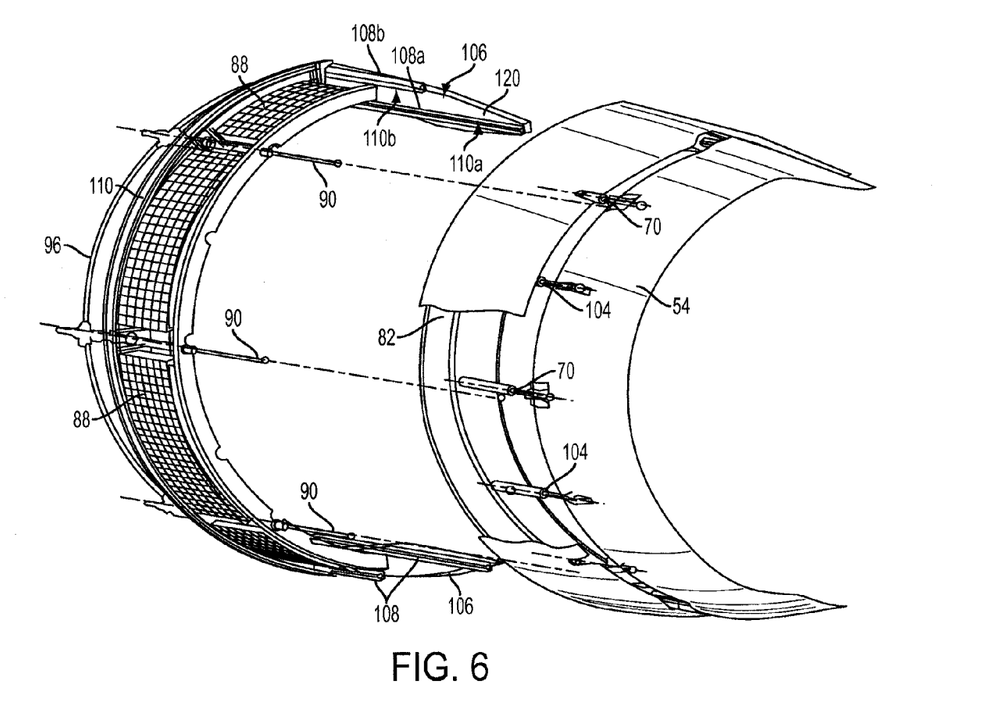
FIG. 6 is an exploded perspective view of the thrust reverser and translating variable area fan nozzle assembly shown in FIGS. 4-5.

FIG. 6 is an exploded view showing the first sleeve section 82 and its corresponding first nozzle section 54 separated from the cascades 88 and sleeve actuators 90. As shown in FIG. 6, one or more nozzle actuators 70 can movably connect the nozzle section 54 to the thrust reverser sleeve section 82.

FIG. 7 shows one embodiment of the upper or lower guide system 102 for movably connecting a thrust reverser segment 82 or a nozzle section 54 to an engine 10. In general, the guide system 102 can include a track assembly 106 and a slider assembly 150. Either assembly can be held stationary while the other translates, although the track assembly 106 is stationary in a preferred embodiment. Referring generally to FIG. 3 and FIG. 6 and particularly to FIG. 7, the guide system 102 can include the track assembly 106 coupled to a beam 120 that can be fixedly attached to a transverse bulkhead 110 on an aft end of a nacelle 18. As shown in FIG. 6, the track assembly 106 can include one or more longitudinally extending track guide members 108, such as, for example, a primary track guide member 108a and a supplemental track guide member 108b. Each track guide member 108 can define a longitudinally extending track channel 110, such as, for example, a primary track channel 110a and a supplemental track channel 110b. The primary track guide member 108a and the supplemental track guide member 108b may be arranged in parallel so as to facilitate corresponding translation of slider assemblies engaged therewith.

Figure 9:
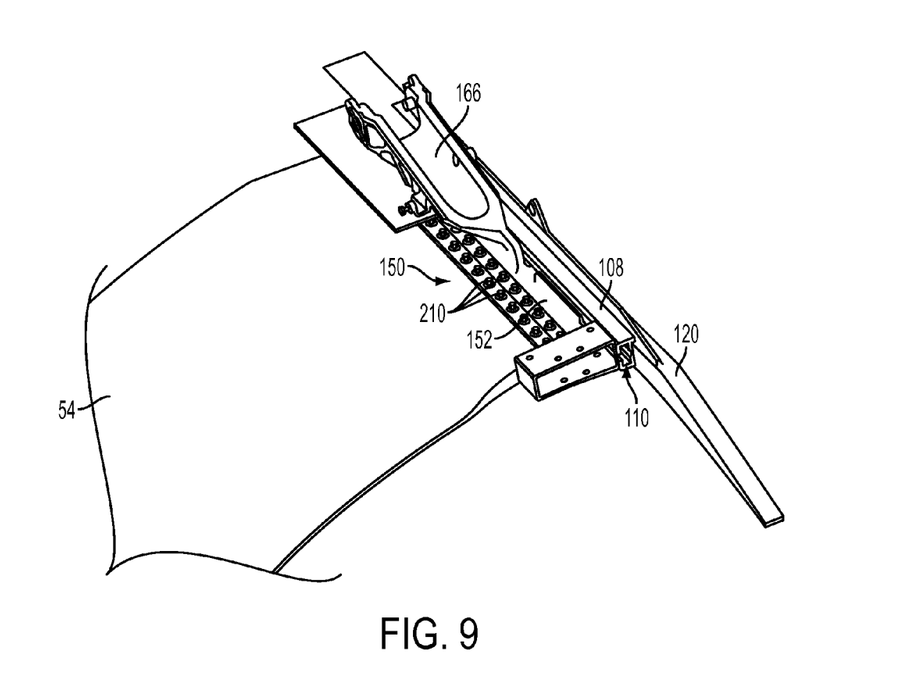
FIG. 9 is a perspective view of a portion of a variable area fan nozzle section coupled to a guide system in accordance with one embodiment of the present invention.

With reference to FIG. 7, the guide system 102 can further include the slider assembly 150 configured to slidably engage the track assembly 106. The slider assembly 150 can include one or more longitudinally extending slider members 152 that are slidably received within the track channels 110 of the track assembly 106. The slider assembly 150 may be connected to the thrust reverser sleeve section 82 so as to slidably connect the sleeve section to the beam 120. In other embodiments, as shown in FIG. 9, the slider assembly 150 may be connected to the nozzle section 54 to slidably connect the nozzle section 54 to the nacelle 18. Accordingly, the nozzle section 54 or the thrust reverser sleeve section 82 can axially translate as the slider member 152 slides within the track channel 110. The nozzle section 54 can be thereby slidably mounted with respect to the sleeve section 82 of the thrust reverser 80.

The translating sleeve section 82 or the translating nozzle section 54 can be actuated through conventional actuation means, such as mechanical, electric, hydraulic or pneumatic or other equivalent actuators, for example. In one embodiment, the nozzle actuator 70 is a constant opening air spring damper with hydraulic closing override, and the sleeve actuator 90 is an electric actuator. Alternatively or in addition, one or more of the actuators 70, 90 can be like an actuator described in U.S. Pat. No. 7,174,828 or in U.S. Patent Application Publication No. 2008/0084130A1, both assigned to Goodrich Actuation Systems Ltd., for example, the disclosures of which are hereby incorporated by reference.

Figure 8:
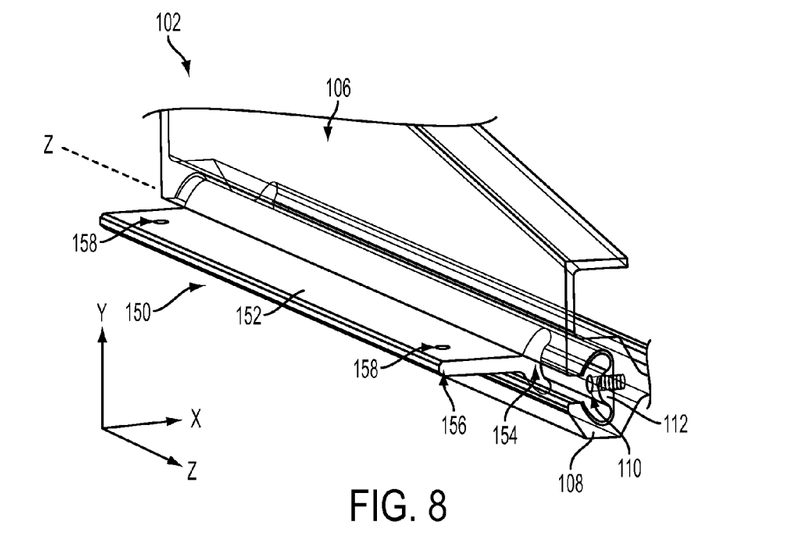
FIG. 8 is a perspective view of the guide system shown in FIG. 7.
Figure 10A:
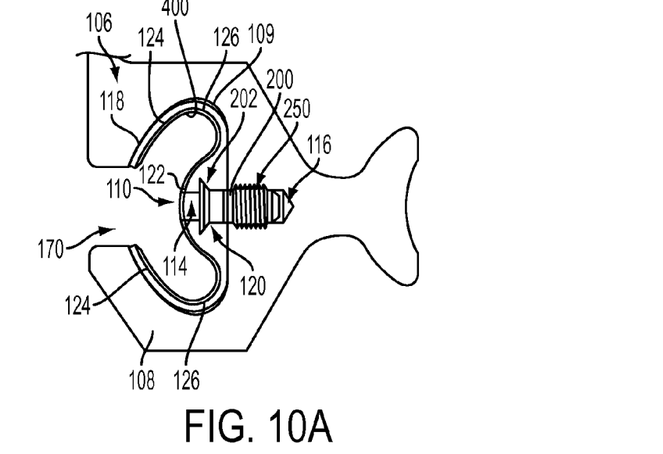
FIG. 10A is an end view of a track assembly of a guide system in accordance with one embodiment of the present invention.
Figure 10B:
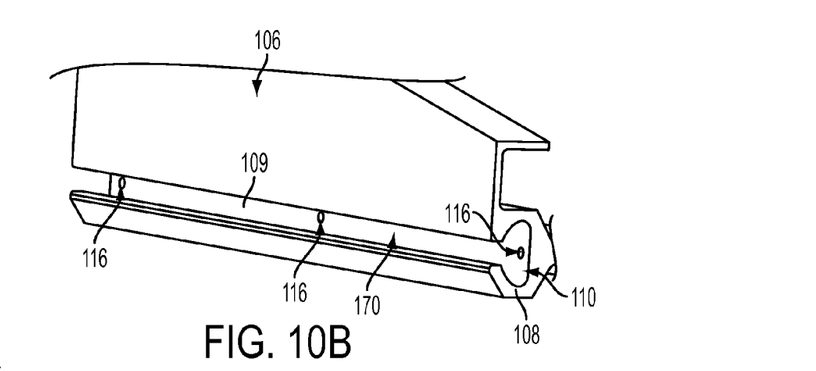
FIG. 10B is a perspective view of a portion of a track assembly of a guide system with a track liner removed therefrom.
Figure 10C:
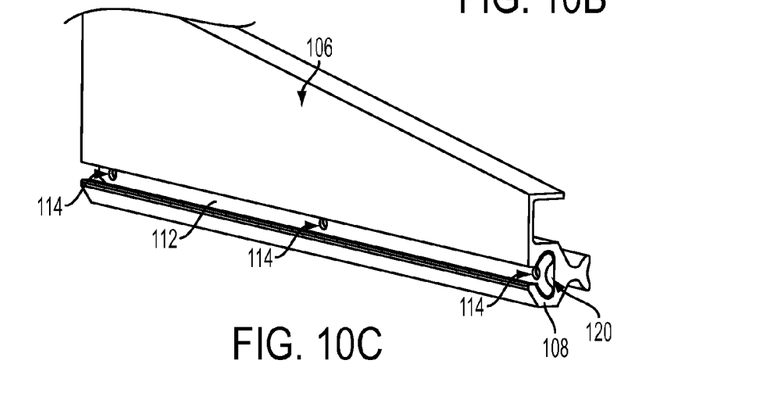
FIG. 10C is a perspective view of a portion of a track assembly of a guide system having a track liner, according to one embodiment of the present invention.

With continuing reference to FIG. 7, as well as FIG. 8, there is shown the guide system 102 according to one embodiment of the present invention. According to such an embodiment, the track assembly 106 includes the track guide member 108, which includes the track channel 110. The track assembly 106 can further include a track liner 112 disposed within the track channel 110, and the track liner 112 may be permanently or temporarily fixed to the track guide member 108 using appropriate methods, e.g., fasteners, adhesives, etc. Alternatively, the track liner 112 may be integrally formed with the track guide member 108 as a single piece. According to an embodiment, the track liner 112 may include a plurality of fastener apertures 114 (shown in FIGS. 10A, 10C, 13D and 14D) for receiving fasteners. Further, the track guide member 108 may include a plurality of associated apertures 116 in corresponding alignment with the fastener apertures 114, thereby permitting a fastener 200 to extend through the track liner 112 and into the track guide member 108 so as to couple the track liner 112 and the track guide member 108 (see FIGS. 10A and 10B). In some instances, an insert member 250 may be positioned within the apertures 116 of the track guide member 108 to provide a complementary fastening mechanism to the fastener 200. The length of the fastener may be such that the head 202 thereof may be advanced into the track liner 112 so as not to interrupt or otherwise obstruct the path of the slider member 152 within the track channel 110. See FIG. 10A.

An exterior surface 118 of the track liner 112 may substantially correspond with an interior surface 109 of the track guide member 108. The track liner 112 can include a projection portion 120 projecting inwardly of the track channel 110 to define a convex surface 122 in the embodiment shown in FIG. 7. The track liner 112 further can define a pair of cylindrical liner surfaces 124 concentric to the convex surface 122 of the track liner 112. That is, the cylindrical liner surfaces 124 and the convex surface 122 share the same central axis. The track guide member 108 is open-ended by defining an elongated opening or slot 170. In this regard, the cylindrical liner surfaces 124 are discontinuous due to the slot 170. Integrally transitioning the cylindrical liner surface 124 to the convex surface 122 is a pair of arcuate liner surface portions 126 defined by the track liner 112.

Figure 11A:
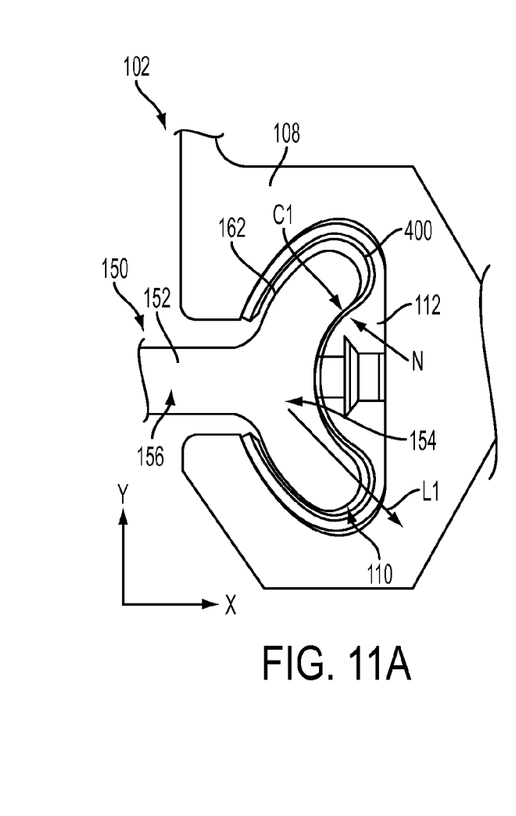
FIGS. 11A-11C are end views of a guide system in accordance with one embodiment of the present invention, illustrating the guide system reacting to various loads.
Figure 11B:
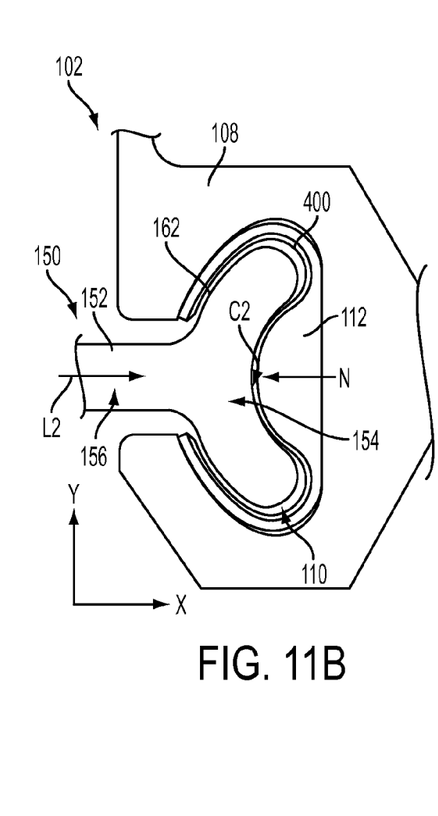
Figure 11C:
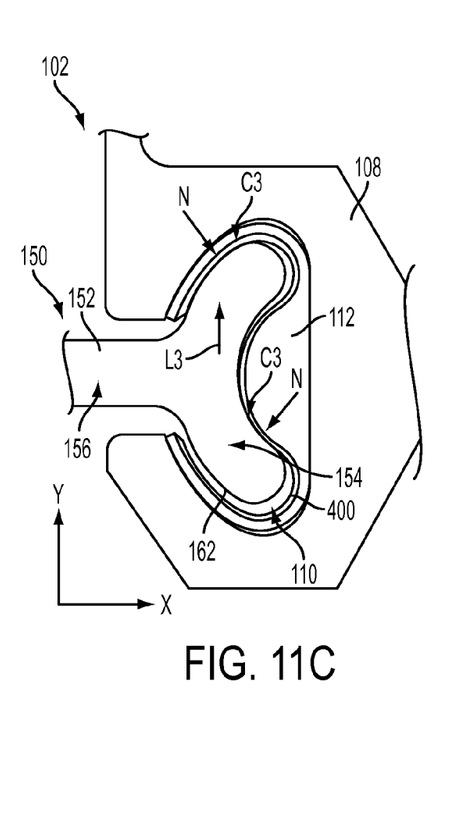
Figure 14A:
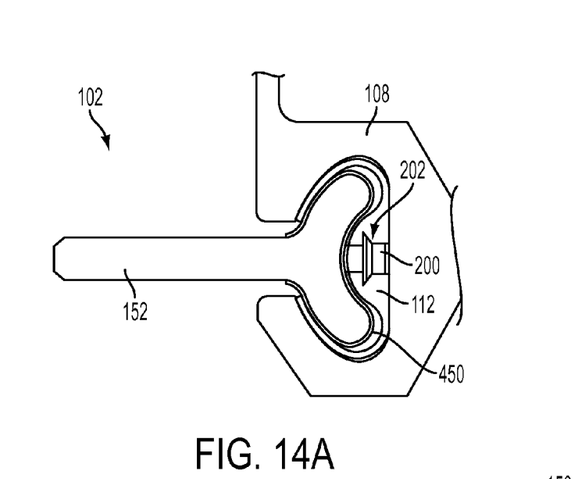
FIGS. 14A-14D are various views of a guide system and its components according to another embodiment of the present invention, wherein the guide system includes a track assembly and a slider assembly having a bearing layer applied thereto.
Figure 14B:
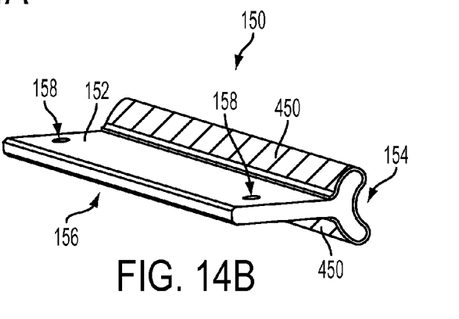
Figure 14C:
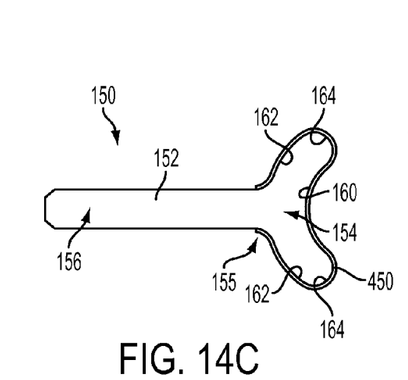
Figure 14D:
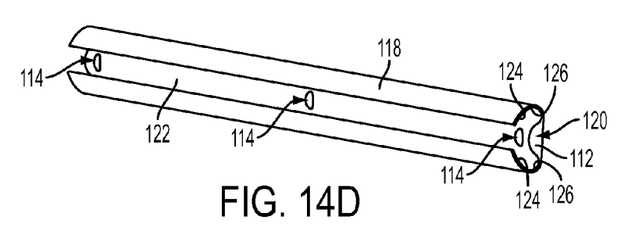

The interior surface of the track liner 112 may be smooth to provide a sliding surface, and, in some instances, the interior surface may have a hard coating applied thereto for improving durability. Preferred materials for the track liner may include, for example, aluminum and steel, and preferred coatings include aluminum oxide formed during hard anodizing (aluminum applications). In some instances, a track bearing layer 400 may be applied to the interior surface of the track liner 112 to facilitate sliding of the slider assembly 150 or the track assembly 106. (FIGS. 11A-11C). In such instances, the slider member 152 may or may not also include a slider bearing layer 450 (FIGS. 14A-14C). The track bearing layer 400 and slider bearing layer 450 may comprise a low friction bearing material such as, for example, self-lubricating liner systems such as KARON (available from Kamatics Corporation), durable high-performance polymide-based polymers such as VESPEL (available from DuPont), and self-lubricating composites such as RULON (available from Saint-Gobain Performance Plastics).

Referring to FIG. 7, the slider member 152 can include a head portion 154 and an extension portion 156 extending therefrom. The head portion 152 is disposed within the track channel 110 and the extension portion 156 extends outwardly of the track assembly 106 through the elongate slot 170. The spacing S of the slot 170 is greater than the thickness T of the extension portion 156 so as to allow rotation of the slider member 152 along an arcuate path R. According to one embodiment, the slider member 152 may rotate between about +/−5 degrees with respect to a longitudinal axis Z (FIG. 8) of the track guide member 108. The extension portion 156 may include a plurality of apertures 158 for receiving fasteners 210 (FIG. 9) to couple the slider assembly 150 to a portion of the nacelle 18. The head portion 154 substantially corresponds to the track liner 112, wherein the head portion 154 has as substantially C-shaped cross-section. In this regard, the head portion 154 defines a concave surface 160 substantially corresponding to the convex surface 122 of the track liner 112 so as to substantially mate therewith. The head portion 154 further defines a pair of cylindrical slider surfaces 162 concentric to the concave surface 160 thereof. That is, the cylindrical slider surfaces 162 and the concave surface 160 share the same central axis. Extending from the head portion 154, the extension portion 156 creates a discontinuity between the slider surfaces 162. Accordingly, the cylindrical liner surface 124 and the cylindrical slider surface 162 are capable of interacting within the track channel 110.

The concave surface 160 and the cylindrical slider surface 162 may be integrally connected or otherwise transitioned in a continuous manner by a pair of arcuate slider surface portions 164. According to one aspect, the radius of the concave surface 160 of the head portion 154 of the slider member 152 is equal to or slightly greater than the radius of the convex surface 122 of the projection portion 120 of the track liner 112. As shown in FIG. 7, a cross-section of the projection portion 120 may comprise an ovoid shaped section 163. The exterior surface of the slider member 152 may be smooth to provide a sliding surface, and, in some instances, the exterior surface may have a hard coating applied thereto for improving durability. Preferred materials for the slider member may include, for example, aluminum, steel, titanium, and preferred coatings include aluminum oxide formed during hard anodizing (aluminum applications). In some instances, the slider assembly 150 may further include an actuator fitting assembly 166 (FIG. 9) attached to or otherwise integral with the extension portion 156, wherein the actuator fitting assembly 166 is configured to receive an actuator device capable of translating the slider assembly 150 in the fore and aft directions, as previously described.

FIGS. 11A-11C illustrate the manner in which the guide system 102 operates under various loads according to one embodiment of the invention. In general, the guide system 102 substantially constrains the slider assembly 150 in the X and Y directions while allowing the slider assembly 150 to translate along the Z axis. The guide system 102 also constrains the slider assembly 150 about the X and Y axes while allowing limited rotation about the Z axis. In this regard, the guide system 102 may be tailored for various applied loads. In some instances, the slider member 152 is tensioned such that the extension portion 156 is pulled outward of the track guide member 108. In this regard, each cylindrical slider surface 162 may include a large radius to allow for greater contact area with the track liner 112 so as to lower contact stress, thereby reducing wear and extending the life of the guide system 102. Furthermore, a large radius reduces the angle of the normal force N, which results in lower friction and less force required for translation.

In the area where the cylindrical liner surface 124 and the cylindrical slider surface 162 interact, the liner surface 124 and the slider surface 162 may have substantially the same radius so as to correspondingly match. Such a configuration may lead to low contact stress and thus reduce wear and extend the life of the guide system 102. In some instances, the radius of the slider surface 162 may be smaller than the radius of the liner surface 124, thereby moving the contact area close to a neck portion 155 (where the head portion 154 and the extension portion 156 meet) of the slider member 152, which can result in lower normal forces and thus reduced friction. In the area where the convex surface 122 and the concave surface 160 interface, the radius of the concave surface 160 may be greater than the radius of the convex surface 122. When the slider assembly 150 is in compression, such a differential in radii may act to center the slider assembly 150 on the track liner 112, thereby reducing normal forces and friction.

FIG. 11A illustrates the guide system 102 reacting a load L1. In this regard, the head portion 154 of the slider member 152 and the track liner 112 of the track guide member 108 contact and interface at a contact portion C1 proximate to an upper portion of the convex surface 122 and the concave surface 160. FIG. 11B illustrates the guide system 102 reacting a compression load L2. In this regard, the head portion 154 of the slider member 152 and the track liner 112 of the track guide member 108 contact and interface at a contact portion C2 at a central portion of the convex surface 122 and the concave surface 160. FIG. 11C illustrates the guide system 102 reacting to an outward radial load L3. In this regard, the head portion 154 of the slider member 152 and the track liner 112 of the track guide member 108 contact and interface at contact portions C3 at a lower portion of the convex surface 122 and the concave surface 160, as well as at an upper portion of the cylindrical liner surface 124 (or bearing member 400) and the cylindrical slider surface 162.

Figure 12A:
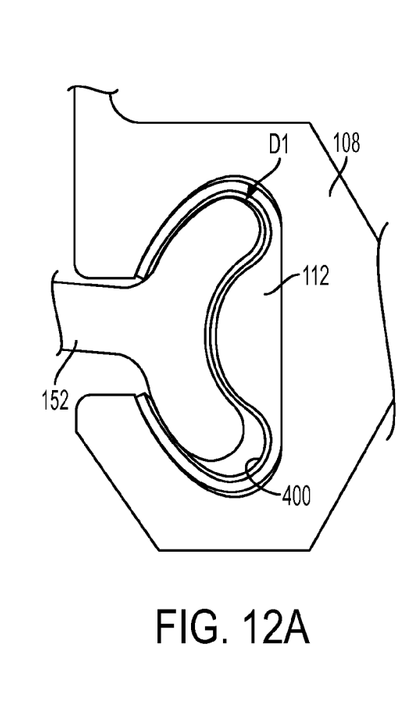
FIGS. 12A-12C are end views of a guide system in accordance with one embodiment of the present invention, illustrating the rotation of a slider assembly of the guide system.
Figure 12B:
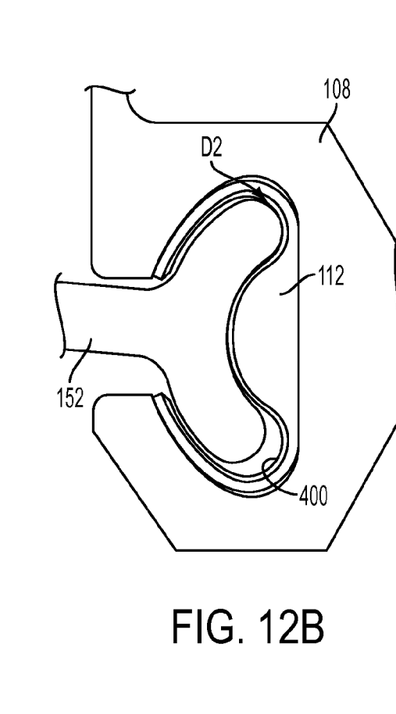
Figure 12C:
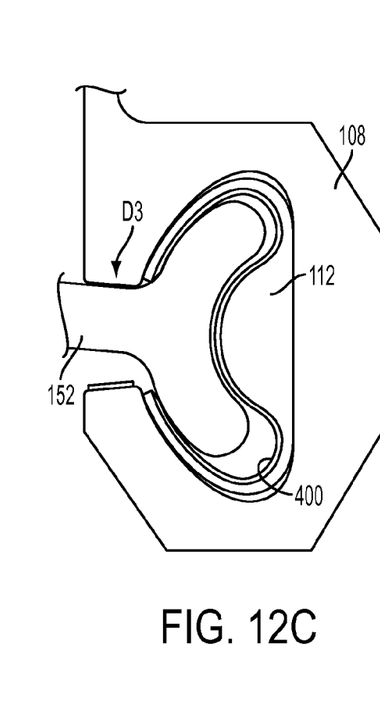
Figure 13A:
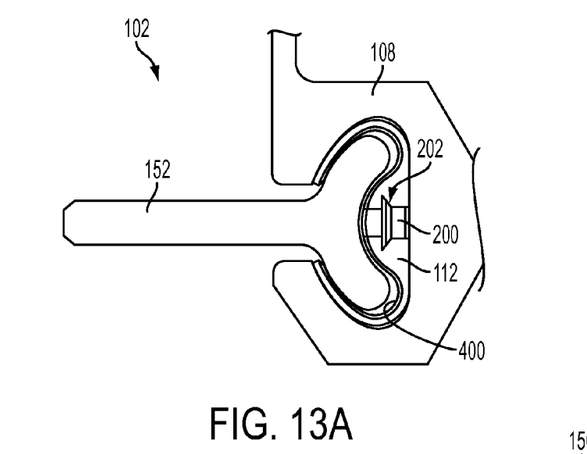
FIGS. 13A-13D are various views of a guide system and its components according to one embodiment of the present invention, wherein the guide system includes a slider assembly and a track assembly having a bearing layer applied thereto.
Figures 13B, 13C:
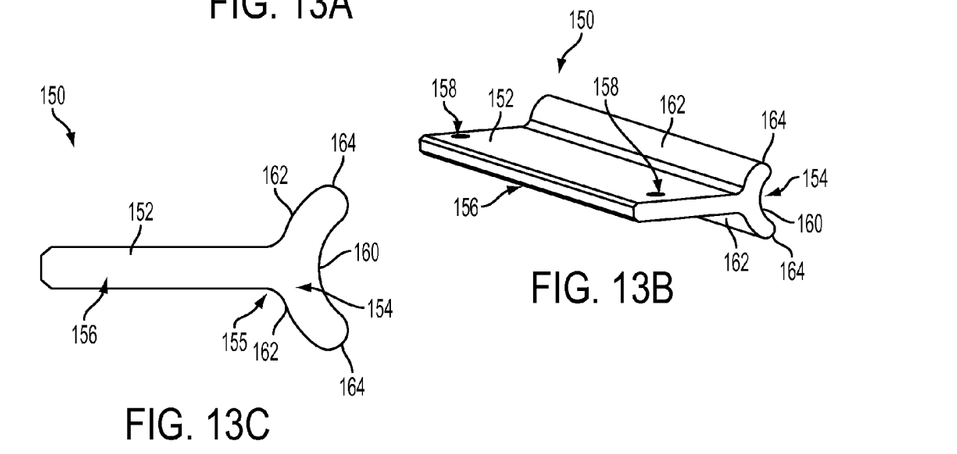
Figure 13D:
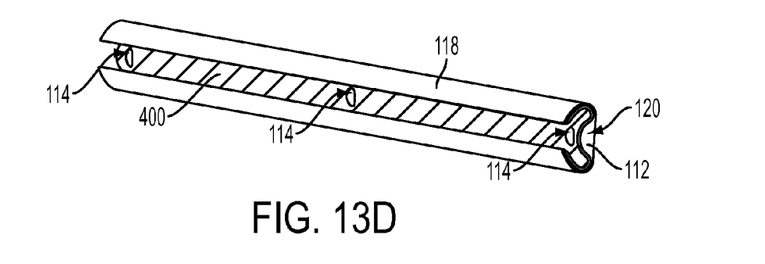

FIGS. 12A-12C illustrate the rotation of the slider assembly 150 within the track channel 110. In some instances, the slider assembly 150 can be prevented from further rotation by one of the arcuate slider surface portions 164 contacting or otherwise interacting with one of the arcuate liner surfaces 126, as shown in FIGS. 12A and 12B. FIG. 12A illustrates the slider assembly 150 being rotated under tension, wherein a detent contact portion D1 prevents the extension portion 156 of the slider member 152 from contacting the portion of the track guide member 108 defining the elongate slot 170. FIG. 12B illustrates the slider assembly 150 being rotated under compression, wherein a detent contact portion D2 prevents the extension portion 156 of the slider member 152 from contacting the portion of the track guide member 108 defining the elongate slot 170. In other instances, the slider assembly 150 may be prevented from further rotation by interaction of the extension portion 156 of the slider member 152 with the portion of the track guide member 108 defining the elongate slot 170, as shown in FIG. 12C, which illustrates a slider assembly 150 being rotated under tension and having a contact portion D3.

FIGS. 13A-13D show one embodiment of the guide system 102 and its components, wherein a bearing material is provided on the track liner 112 as the track bearing layer 400 (shown in hatching) That is, the bearing material is provided on the track assembly 106, rather than on the slider assembly 150.

FIGS. 14A-14D show another embodiment of the guide system 102 and its components, wherein a bearing material is provided on the head portion 154 of the slider member 152 as the slider bearing layer 450 (shown in hatching). In contrast to the embodiment shown in FIGS. 13A-13D, the bearing material is provided on the slider assembly 150, rather than the track assembly 106. The bearing material may be a low friction bearing material or any other suitable bearing materials, such as, for example, self-lubricating liner systems such as KARON (available from Kamatics Corporation), durable high-performance polymide-based polymers such as VESPEL (available from DuPont), and self-lubricating composites such as RULON (available from Saint-Gobain Performance Plastics).

Persons of ordinary skill in the art will understand that while the invention has been described in terms of various embodiments and various aspects and features, certain modifications, variations, changes and additions can be made to the described embodiments without departing from the spirit and scope of the invention. Such modifications, variations, changes and additions are intended to be within the scope of the appended claims.

What is claimed is:

1. A guide system for translating components of an aircraft engine nacelle, the guide system comprising:
a track assembly adapted to operably engage a first portion of a nacelle, the track assembly comprising a track guide member and a track liner operably engaged therewith, the track guide member having a track channel configured to receive the track liner, the track liner defining an interior surface and having a projection portion projecting inwardly of the track channel to define a convex surface, wherein a cross-section of the projection portion comprises an ovoid shaped section; and
a slider assembly configured to translatably engage the track assembly, the slider assembly comprising a slider member having a head portion configured to be received within the track channel, the head portion defining a concave surface substantially corresponding to the convex surface of the track liner and configured to mate therewith, the slider member further having an extension portion extending from the head portion and outwardly of the track assembly, wherein a portion of the concave surface is shaped to mirror a portion of the ovoid shaped section.

2. A guide system according to claim 1 wherein the interior surface of the track liner includes a plurality of cylindrical liner surfaces concentric to the convex surface of the track liner, and the head portion of the slider member includes a plurality of cylindrical slider surfaces concentric to the concave surface of the head portion, wherein each cylindrical liner surface and the respective cylindrical slider surface are capable of interacting within the track channel.

3. A guide system according to claim 1 wherein a radius of the concave surface of the slider member is greater than a radius of the convex surface of the projection portion of the track liner.

4. A guide system according to claim 1 wherein the extension portion of the slider member extends outwardly of the track assembly via an elongate slot defined by the track guide member, the slot being configured to permit rotation therewithin of the extension portion substantially between about +/−5 degrees of a longitudinal axis of the track guide member.

5. A guide system according to claim 1 wherein the track assembly further comprises a track bearing layer operably engaged with the track liner about the interior surface thereof, the track bearing layer comprised of a low friction bearing material.

6. A guide system according to claim 1 wherein the slider assembly further comprises a slider bearing layer operably engaged with the slider member about the head portion thereof, the slider bearing layer comprised of a low friction bearing material.

7. A guide system according to claim 1 wherein the projection portion of the track liner defines a plurality of first fastener apertures and the track body guide member defines a plurality of second fastener apertures in corresponding alignment with the first fastener apertures such that a fastener is capable of being received through both the first and second fastener apertures for coupling the track liner to the track guide member.

8. A nacelle for a turbofan aircraft engine, the nacelle comprising:
    a first nacelle portion;
    a track assembly operably engaged with the first nacelle portion, the track assembly comprising a track guide member and a track liner operably engaged therewith, the track guide member having a track channel configured to receive the track liner, the track liner defining an interior surface and having a projection portion projecting inwardly of the track channel to define a convex surface, wherein a cross-section of the projection portion comprises an ovoid shaped section;
    a slider assembly configured to translatably engage the track assembly, the slider assembly comprising a slider member having a head portion configured to be received within the track channel, the head portion defining a concave surface substantially corresponding to the convex surface of the track liner and configured to mate therewith, the slider member further having an extension portion extending from the head portion and outwardly of the track assembly, wherein a portion of the concave surface is shaped to mirror a portion of the ovoid shaped section; and
    a second nacelle portion operably engaged with the extension portion of the slider member.

9. A nacelle according to claim 8 wherein the interior surface of the track liner includes a plurality of cylindrical liner surfaces concentric to the convex surface of the track liner, and the head portion of the slider member includes a plurality of cylindrical slider surfaces concentric to the concave surface of the head portion, wherein each cylindrical liner surface and the respective cylindrical slider surface are capable of interacting within the track channel.

10. A nacelle according to claim 8 wherein a radius of the concave surface of the slider member is greater than a radius of the convex surface of the projection portion of the track liner.

11. A nacelle according to claim 8 wherein the extension portion of the slider member extends outwardly of the track assembly via an elongate slot defined by the track guide member, the slot being configured to permit rotation therewithin of the extension portion substantially between about +/−5 degrees of a longitudinal axis of the track guide member.

12. A nacelle according to claim 8 wherein the projection portion of the track liner defines a plurality of first fastener apertures and the track guide member defines a plurality of second fastener apertures in corresponding alignment with the first fastener apertures such that a fastener is capable of being received through both the first and second fastener apertures for coupling the track liner to the track guide member.

13. A nacelle according to claim 8 wherein the slider assembly further comprises a supplemental slider member and the track assembly further comprises a supplemental track guide member defining a supplemental track channel configured to receive the supplemental slider member, the track channel and the supplemental track channel being arranged substantially in parallel such that the slider member and the supplemental slider member are capable of corresponding translation within the respective track channel and supplemental track channel.

14. A nacelle according to claim 8 further comprising an actuator engaged with the slider assembly.

15. A nacelle according to claim 8 wherein the track assembly is translatable with respect to the slider assembly.

16. A nacelle according to claim 15 wherein the first nacelle portion is one of a translatable variable area fan nozzle section and a translatable thrust reverser sleeve.

17. A nacelle according to claim 8 wherein the slider assembly is translatable with respect to the track assembly.

18. A nacelle according to claim 17 wherein the second nacelle portion is one of a translatable variable area fan nozzle section and a translatable thrust reverser sleeve.

19. A nacelle for a turbofan aircraft engine, the nacelle comprising: a stationary first nacelle portion; a stationary track assembly operably engaged with the stationary first nacelle portion, the track assembly comprising a track guide member and a track liner operably engaged therewith, the track guide member having a track channel configured to receive the track liner, the track liner defining an interior surface and having a projection portion projecting inwardly of the track channel to define a convex surface;
    means for slidably engaging one of a translatable variable area fan nozzle section and a translatable thrust reverser sleeve to the stationary track assembly, wherein the means for slidably engaging the one of a translatable variable area fan nozzle section and a translatable thrust reverser sleeve comprises a concave portion substantially corresponding to the convex portion of the track assembly, the concave portion being configured to correspondingly mate with the convex portion, wherein a portion of the concave surface is shaped to mirror a portion of the ovoid shaped section; and
    means for actuating the means for slidably engaging the one of a translatable variable area fan nozzle section and a translatable thrust reverser sleeve.

20. A nacelle according to claim 19 wherein the means for slidably engaging the one of a translatable variable area fan nozzle section and a translatable thrust reverser sleeve comprises a slider assembly configured to slidably engage the track assembly, the slider assembly comprising a slider member having a head portion configured to be received within the track channel, the head portion defining a concave surface substantially corresponding to the convex surface of the track liner and configured to mate therewith, the slider member further having an extension portion extending from the head portion and outwardly of the track assembly, the extension portion being operably engaged with the one of a translatable variable area fan nozzle section and a translatable thrust reverser sleeve.

* * * * *